(12) United States Patent
Pon

(10) Patent No.: US 8,094,072 B2
(45) Date of Patent: Jan. 10, 2012

(54) ADAPTIVE COHERENT INTEGRATION TIME

(75) Inventor: Rayman Pon, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 12/115,438

(22) Filed: May 5, 2008

(65) Prior Publication Data

US 2009/0273514 A1   Nov. 5, 2009

(51) Int. Cl.
*G01S 19/30* (2010.01)
(52) U.S. Cl. .................................................. 342/357.69
(58) Field of Classification Search ............. 342/357.06, 342/357.13, 357.15, 357.29, 357.42, 357.48, 342/357.69; 701/213, 215
See application file for complete search history.

(56) References Cited

U.S. PATENT DOCUMENTS

| | | | |
|---|---|---|---|
| 6,724,343 B2 * | 4/2004 | Asher et al. | 342/357.12 |
| 6,775,802 B2 | 8/2004 | Gaal | |
| 7,362,795 B1 * | 4/2008 | Lennen | 375/149 |
| 2008/0112469 A1 * | 5/2008 | Goldberg et al. | 375/150 |

FOREIGN PATENT DOCUMENTS

| | | |
|---|---|---|
| EP | 1160582 | 12/2001 |
| EP | 1564564 | 8/2005 |
| WO | WO20049695 A1 | 8/2000 |

OTHER PUBLICATIONS

International Search Report and Written Opinion—PCT/US09/042401, International Searching Authority—European Patent Office, Oct. 19, 2009.

* cited by examiner

*Primary Examiner* — Dao L Phan
(74) *Attorney, Agent, or Firm* — Linda G. Gunderson

(57) ABSTRACT

A mobile receiver having a coherent integration time that can be adaptively lengthened and shortened. The coherent integration time is based on determining whether information is already known regarding a received satellite signal. Thus, when information, such as, ephemeris, satellite clock, time, almanac, and/or other information, is known, the coherent integration time can be set to a longer time and when information is not known, the information can be set at a shorter time frame.

43 Claims, 5 Drawing Sheets

US 8,094,072 B2

ADAPTIVE COHERENT INTEGRATION TIME

FIELD

The technology of the present application relates generally to signal detection, and more specifically to an adaptive coherent integration time to facilitate signal acquisition and detection.

BACKGROUND

Many electronic devices are configured to determine position using satellite positioning system(s). To determine the position, the electronic device acquires signals from a plurality of satellites orbiting the Earth. Using information contained in these signals, the device or an adjunct device, such as a position determining entity, calculates the position or location of the electronic device.

As can be appreciated, the devices must acquire satellite signals in order to use the signal. Acquisition of satellite signals can be difficult as the signal strength is frequently attenuated and weak at the Earth's surface. For example, the Global Positioning System, which is one example of a Satellite Positioning System, provides a signal strength only slightly above the minimum signal acquisition strengths of most devices.

"Acquisition" refers to differentiation of the signal from a particular source (e.g., a first satellite in a first satellite system) from other signals. In the GPS satellite system, this is accomplished by determining the relative phase of the coarse acquisition (C/A) pseudorandom noise (PN) code for a particular satellite at the receiver. In general, the receiver searches in code phase space by generating copies of the satellite's PN code at different relative offsets and correlating the received signal with the generated code. Peaks in the power of the correlation result generally designate the code phase offset (although effects like multipath can make analysis more difficult). Additionally, because the satellite is moving with respect to the receiver or the receiver is moving with respect to the satellite, a search in frequency space can be performed to account for the Doppler Effect. Doppler changes the frequency of the carrier at the receiver, as well as effectively increasing or decreasing the duration of each chip of the PN code.

To facilitate acquisition of the satellite signals, some conventional satellite receivers include a sequential detection algorithm to acquire the code division multiple access (generally known as CDMA) signal (e.g., the PN code for a GPS satellite). The detection algorithm allows lower acquisition thresholds by measuring the power of a correlation signal over a predetermined length of time. If the power of the signal is over a predefined threshold, it is considered a satellite signal instead of noise. Noise signals, as can be appreciated, would tend to have 0 or close to 0 power when correlated with a generated code signal over a length of time. Measuring power over a period of time is generally known in the art and includes both a coherent integration time (sometimes referred to as "CIT") and a non-coherent integration period (a number of times that coherent integration will be performed). The coherent integration time is also commonly known as the pre-detection interval, while the non-coherent integration is commonly known as post detection interval.

Conventionally, coherent integration times are set at approximately 1 to 20 milliseconds for GPS when the data bits are not known. For GPS, the C/A code, a government precision code (P code), and a navigation message are transmitted on the L1 carrier frequency (1575.42 MHz). The C/A code is 1023 chips long and approximately a millisecond in length, so that each code chip has a duration of about a microsecond. The navigation message has a relatively low data rate; at 50 bits/second, the duration of each bit is about 20 milliseconds. Therefore, correlation of the received signal with the generated PN code may be unpredictably interrupted by a signal reversal at the next bit boundary (if the message has a transition from one to the other of the binary states). It may be advantageous to provide even longer coherent integration times to maximize signal acquisition. Longer coherent integration times provide numerous advantages and numerous disadvantages. Advantages of longer coherent integration times include, for example, reduction of the in-band noise and provides more integration (i.e., longer integration time increases the signal power of the correlation result over the interval, allowing better discrimination of the signal from the satellite). Disadvantages of longer coherent integration times include, for example, a potential of signal reversal due to transmitted data bits (which causes signal power over the interval to decease), reduction in frequency coverage, and potential loss of satellite signal information.

For example, conventional technology may set the coherent integration time at 20 milliseconds. If, for example, the number of non-coherent integration intervals is set at 50, the total integration time of the signal provides a certain amount of energy, which may or may not be sufficient to acquire a weak signal. Increasing the number of non-coherent integrations to, for example, 100, increases the gain by approximately 1.5 dB, but significantly lengthens (doubles) the total integration time. Extending the coherent integration time to 40 milliseconds and decreasing the number of non-coherent integrations to 25 also increases the total gain by approximately 1.5 dB, without significantly lengthening the total integration time. While less integration time and greater energy capture provide significant advantages, consistently providing a coherent integration time longer than 20 milliseconds risks the potential for signal loss.

Against this background, it would be desirous to provide an adaptive coherent integration time that could be shortened and lengthen depending on the circumstances.

SUMMARY

Aspects of the technology of the present application include embodiments disclosed herein that address the above stated needs by providing a method for adaptively adjusting the coherent integration time timeframe of a mobile receiver. The method includes receiving a signal at the mobile receiver and determining whether the next N bits are known and valid. If information such as the almanac and ephemeris information is known, the coherent integration time is set to a longer timeframe than if the information is not known. The sign of the known N data bits are used to adjust the correlations to effectively remove the effects of the data bits. Other aspects of the methodology include determining the validity of the known information. The validity may be determined based on the age of the information.

Other aspects of the technology include embodiments disclosed herein that address a mobile receiver. The mobile receiver has a receiver to receive a signal. A control processor determines whether information associated with the signal is known and valid and sets a coherent integration time to a longer or shorter timeframe based on the known and valid information.

Yet other aspects of the technology include embodiments disclosed herein that provide an apparatus that receives a signal along with a means for determining whether information associated with the signal is known information. Means for determining whether the known information is valid also is provided such that if there is known and valid information regarding the signal, the coherent integration time can be lengthened or shortened based on the known and valid information.

Still other aspects of the technology include a computer program product having a computer readable storage medium with program code. The program code includes program code to cause reception of a signal at the mobile receiver. Program code exists to determine whether information contained in the signal is known and program code to adaptively set a coherent integration time based on the known information, including to set the coherent integration time to a default value if there is no known information.

DETAILED DESCRIPTION

The technology of the present application will now be explained with reference to the figures. While the technology of the present application is described with reference to satellite acquisition using a CDMA signal, one of ordinary skill in the art would now recognize on reading the disclosure that the technology could be used for alternative signal acquisition. Moreover, the technology of the present application will be described with reference to certain exemplary embodiments herein. The word "exemplary" is used herein to mean "serving as an example, instance, or illustration." Any embodiment described herein as "exemplary" is not necessarily to be construed as preferred or advantageous over other embodiments. The detailed description includes specific details for the purpose of providing a thorough understanding of the technology of the present application. However, on reading the disclosure, it will be apparent to those skilled in the art that the technology of the present application may be practiced with or without these specific details. In some descriptions herein, generally understood structures and devices may be shown in block diagrams to aid in understanding the technology of the present invention without obscuring the technology. In certain instances and examples herein, the term coupled or in communication with means connected to using either a direct or indirect data link as is generally understood in the art. The connection may be wired or wireless, networked, or the like.

Figure 1:
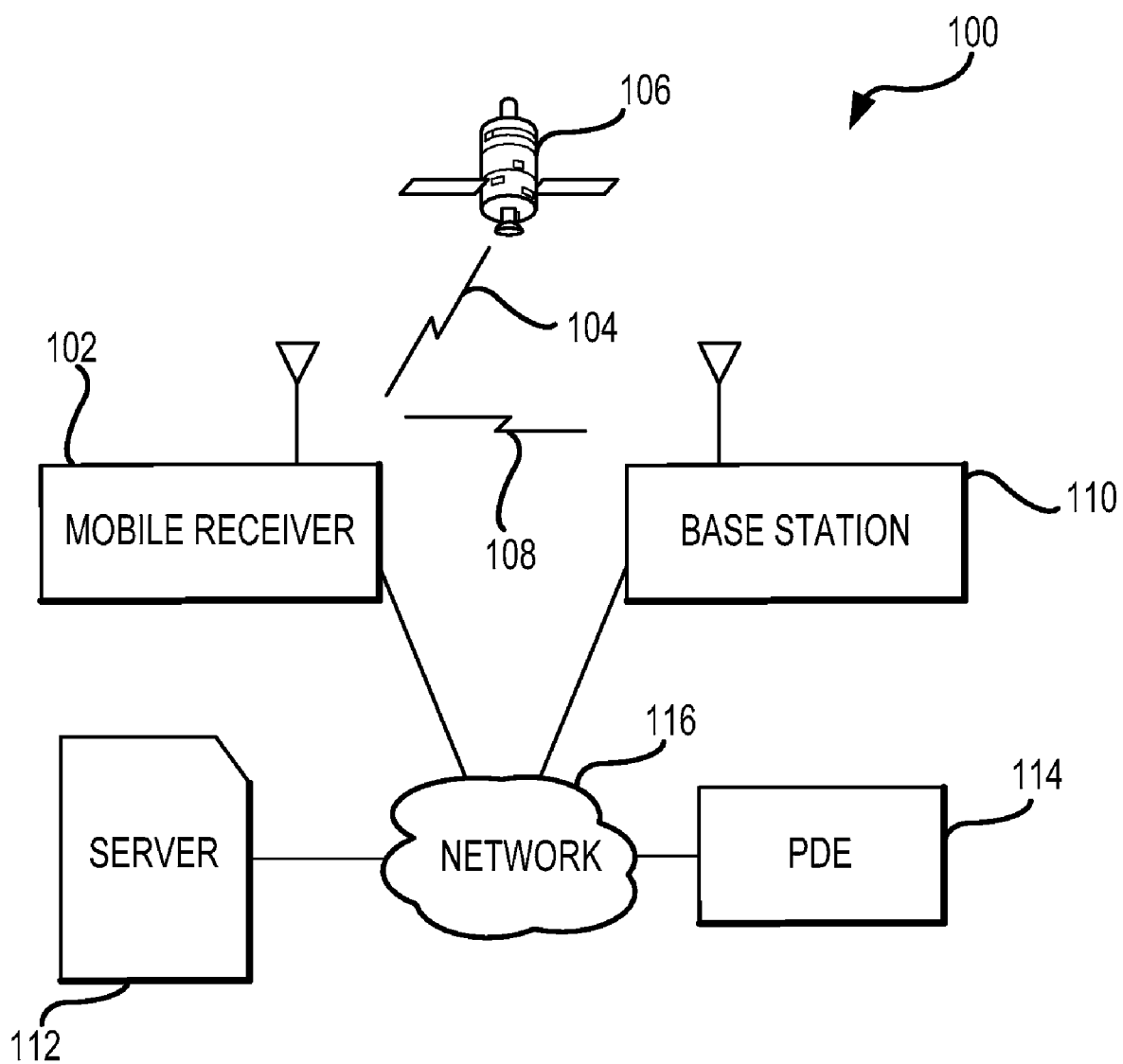
FIG. 1 is an exemplary embodiment of a network of the technology of the present application.
Figure 2:
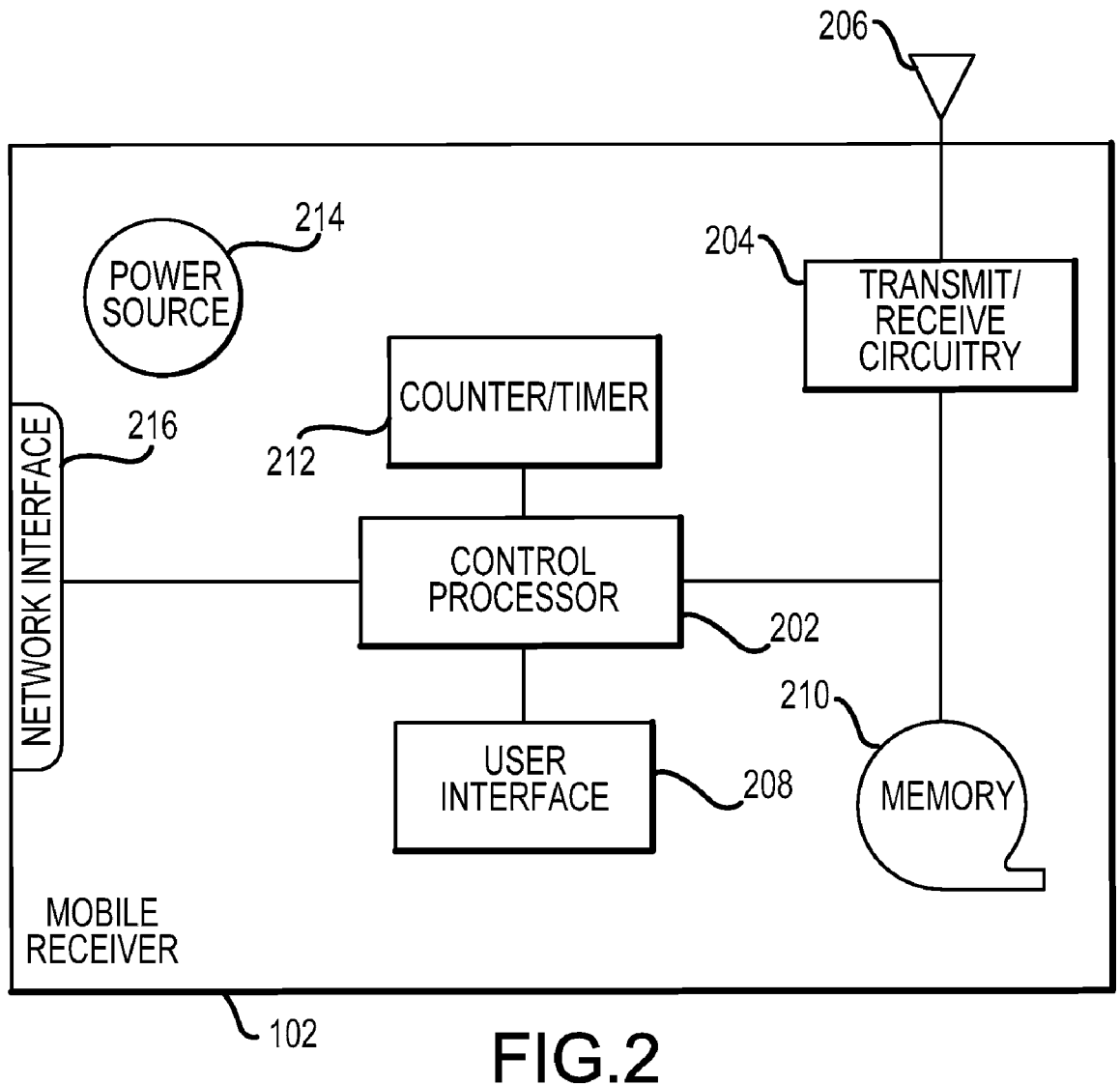
FIG. 2 is an exemplary embodiment of a mobile receiver associated with the network of FIG. 1.

Referring first to FIG. 1, an exemplary wireless communications network 100 is provided. Network 100 includes a mobile receiver 102 that receives a navigation signal, such as a signal 104 from one or more satellites 106 (of which satellites associated with the global positioning system are but one example) and/or a signal 108 from one or more base stations 110. Signals 104 and 108 may be used for data transmission as well as for computing location, direction, or the like. Mobile receiver 102 may include any number of conventional devices including, for example, a cellular telephone, a positioning device, a radio, a mobile computer, an electronic game, or the like. In some embodiments described herein, mobile receiver 102 integrates a Global Positioning System (GPS—Originally titled NAVSTAR GPS when developed by the military) receiver and uses GPS to determine its position. Although described as a GPS receiver or in conjunction with GPS, one of ordinary skill in the art will now recognize the technology of the present application may be incorporated into any positioning system including other satellite positioning systems (SPS), such as, for example, other Global Navigation Satellite Systems (GNSS), Galileo positioning system (Europe), Glonass (Russian), Compass/Beidou (Chinese), QZSS (Japanese), a combination thereof, and the like. Mobile receiver 102 may be a receiver only or may incorporate reception and transmission (as shown in FIG. 2). Mobile receivers may include cellular telephones, GPS position locators, wireless communication devices and equipment, laptop or hand-held computers, personal digital assistants, and the like.

Referring to FIG. 2, mobile receiver 102 is shown in more detail. Mobile receiver 102 includes, for example, a control processor 202, such as a microprocessor, chipsets, field programmable gate array logic, or the like, that controls the computing functionality to process many inputs and/or data as may be required for the operation of the mobile receiver 102. Connected to the control processor 202 is transmit/receive circuitry 204 that transmits/receives wireless signals to/from an antenna 206. Transmit/receive circuitry 204 may be a single transceiver or a separate transmitter and receiver (generically referred to as transmission circuitry 204). The transmit/receive circuitry 204 performs functions typical of such components as used in wireless communications, such as modulating signals received from the control processor 202 that are to be transmitted over the antenna 206, and demodulating signals received from the antenna 206 and providing the demodulated signals to the control processor 202. The antenna 206 may be any antenna suitable for wireless communications in the wireless communications network 100, and while illustrated as a single antenna, may include one or more different send and receive antennas. A user interface 208 is interconnected with the control processor 202, and provides an audio, visual, and/or a physical interface to a user. Such user interfaces 208 commonly include a speaker, microphone, visual display screen, and one or more physical input devices such as a keypad, track wheel, and/or special input buttons that control speaker/ringer volume, etc. The control processor 202, in this embodiment, also is interconnected with a memory 210 that may be used to store processing instructions to be executed by the control processor 202. The memory 210 also may store data necessary or convenient for the operation of the remote station or mobile receiver 102, such as data relating to signal acquisition, ephemeris, almanac, satellite health, and ionosphere and/or time information. Time information may include Coordinated Universal Time (UTC) information. Data, of course, may be stored remote from the mobile receiver 102 at, for example, a centrally located and accessible server 112 or positioning determining entity (PDE) 114. Now referring back to FIG. 1, server 112 or PDE 114 may be connected to mobile receiver 102 via a base station 110 and a network connection 116 and network interface 216 as is commonly understood in the art. Memory 210 may include volatile and/or nonvolatile memory on any suitable storage media. In various exemplary embodiments described herein, the memory 210 is used to store ephemeris, almanac and the like information as will be useful in determine the time interval to be applied for the coherent integration time. Mobile receiver 102 also may include a counter/timer 212 as will be explained in more detail below. Mobile receiver 102 contains a power source 214 to power the various components contained therein. The power source 214 may be a rechargeable battery pack, as is currently conventional, or any suitable means to provide power.

Figure 3:
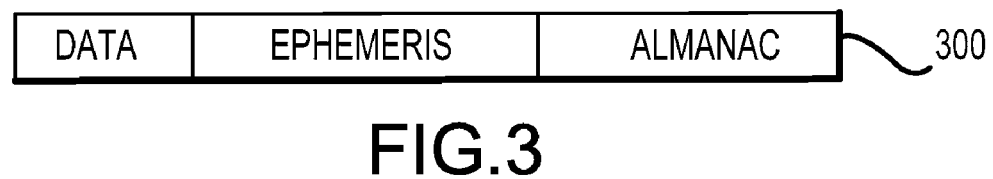
FIG. 3 is an exemplary embodiment of a portion of a satellite data signal.

As mentioned above, the technology of the present application is usable in many systems, including several satellite systems. In generally, each of these systems provide signals having potentially known and potentially unknown data. For example, referring now to FIG. 3, a portion of a typical GPS satellite signal 300 is shown. The portion of the satellite signal is a 30 second frame length signal transmitted at a rate of 50 bits/second and transmitted 24 hours a day, with the entire navigation message including 25 frames and encompassing 12.5 minutes (also referred to as a superframe). The signal contains, for example, time-of-day information, GPS week number, satellite health, ephemeris, satellite clock corrections, and almanac information. Of the 30 second signal in a frame, approximately 24 seconds of the signal relates to ephemeris, satellite clock, and almanac information, with the remaining 6 seconds (the first 1.2 seconds in each of five sub-frames) relating to time and frame synchronization information, provided by a telemetry word (TLM) and handover word (HOW) at the beginning of the sub-frame. As is generally known, ephemeris and satellite clock information is valid for approximately 4 hours and the almanac data is typically valid for a much longer period. Thus, of the 30 second frame, if the ephemeris, satellite clock, and almanac information is already known, i.e., stored in memory 210, then typically at least 24 seconds of the satellite signal is wasted while the known information is rebroadcast to the mobile receiver 102. The remaining 6 seconds of the signal also may be known. Certain portions of the 6 and 24 seconds, however, are subject to change despite having known and valid ephemeris, satellite clock, almanac, and time information.

Because a large portion of the satellite signal is known, i.e., valid ephemeris, satellite clock, time, almanac data, TLM bits, and/or HOW bits, the coherent integration time can be extended to enhance signal integration without risk of stripping incorrect data from the signal. In other words, it is possible to provide an adaptive coherent integration time that adapts in length based on the amount of valid information mobile receiver 102 has stored (which provides information indicative of the value of one or more of the next consecutive bits, allowing the correlation to properly compensate for the data in the navigation message). The coherent integration time may be adaptively set at a conventional 20 milliseconds (for GPS) when no information is known regarding the signal being acquired, and the data content in the signal. If the mobile receiver 102 knows all related information, such as, for example, ephemeris, satellite clock, time, and almanac data, the coherent integration time may be set at a longer time during the periods where this data is transmitted, such as, for example, 40, 80, 160, 320 milliseconds or the like. If some information is known, but other information is not known, the coherent integration time may be adaptively set for a time between a minimum and maximum coherent integration time. For example, with the data bit edge determined, if the minimum coherent integration time is 20 milliseconds and the maximum is 160 milliseconds (7 additional bits), then if the current and upcoming bit is known, the coherent integration time may be set to 40 milliseconds. Similarly, if the value of current and two consecutive future bits are known, the coherent integration time may be set to 60 milliseconds, and if the current and seven or more consecutive future bits are known, then the coherent integration time may be set to its maximum of 160 milliseconds. Notice the length of time for the coherent integration time is provided as multiples of the conventional 20 millisecond coherent integration time. Other timeframes could be used based largely on overall system characteristics, but the 20 millisecond multiples provides the most natural boundaries (for GPS) to simplify the logic in the mobile receiver hardware and software. Other periods are possible As can be appreciated, lengthening integration time has the effect of narrowing the effective bandwidth. Narrowing the bandwidth requires more frequency bins that have to be searched and analyzed over the signal space. Similarly, shortening the interval results in widening the bandwidths. Thus, as the coherent integration time is adjusted, based on the amount of known or unknown information, the number of frequency bins must additionally be adaptively changed to more, narrow frequency bins or fewer, wider frequency bins. As an alternative, the number of frequency bins can be fixed at the amount needed for the largest coherent integration time (as this requires the most frequency bins), with the number of frequency bins selected to ensure coverage of the signal space. The bandwidths of each of the frequency bins then changes as the coherent integration time changes, and this effect can be compensated. In some configurations, the maximum coherent integration time can be set based at least in part on the system's ability to process narrow bandwidth information (e.g., a maximum number or minimum width of frequency bins).

Figure 4:
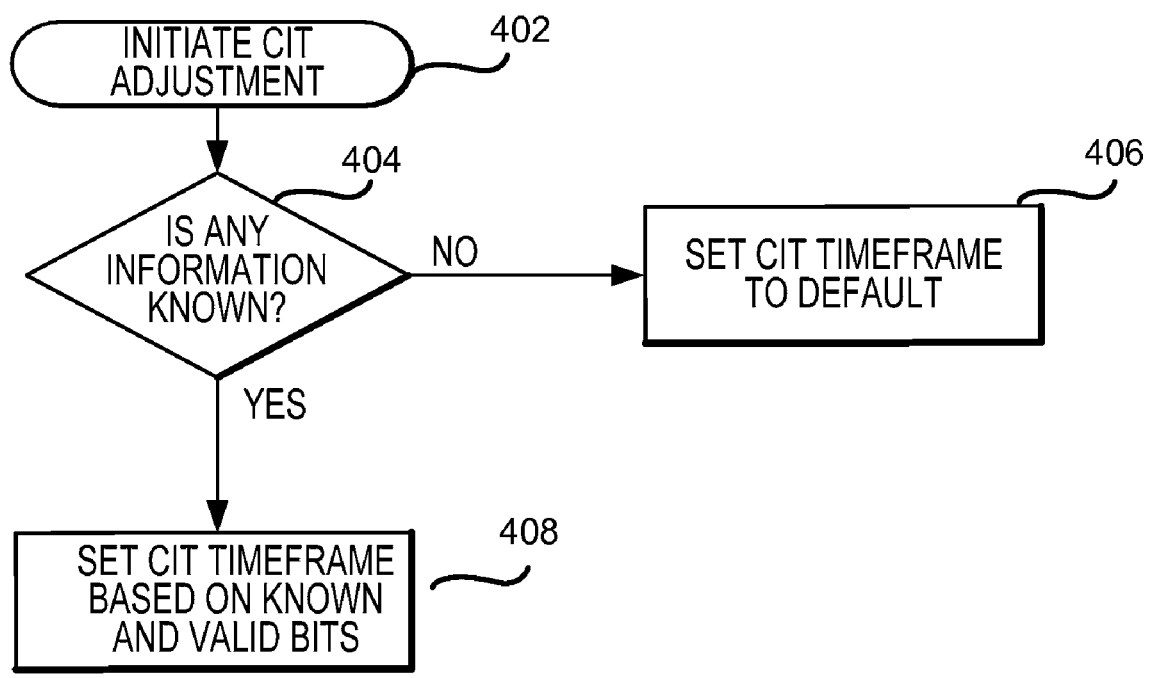
FIG. 4 is an exemplary embodiment of operational steps illustrating one exemplary operation of the technology of the present application.

Referring now to FIG. 4, operational steps for adaptively adjusting the coherent integration time are now described for an exemplary embodiment. It is noted, at the outset, that the operational steps described in any of the exemplary embodiments herein are described to provide examples and illustrations. The operations described may be performed in numerous different sequences other than the illustrated sequences. Additionally, one or more operational steps described in the following exemplary embodiments may be combined with one or more other operational steps or one or more operational steps described may be broken up into multiple operational steps. Moreover, more, less, and other operational steps may be included without departing from the spirit and scope of the invention as claimed herein.

In the exemplary embodiment of FIG. 4, an operation starts at block or step 402. Operations start by initiating an adaptive coherent integration time adjustment, step 402. At step 404, it would be determined whether any information is known and valid. If no information is known, the adaptive coherent integration time is set to the default time, typically a minimum timeframe, such as, 20 milliseconds or less as is conventional and generally understood in the art, step 406. Determining whether information is known and valid relates to knowing the data stream and being able to determine that the next N bits of data being broadcast over the data stream are known and valid information as the data is, for example, already stored. If it is determined that the next N bits of data are known and valid, the coherent integration time is set to a value based on the known and valid N bits, step 408. For example, if at least N bits corresponding to a maximum coherent integration time are known, the coherent integration time may be established at the maximum value, such as, for example, 160 milliseconds (8 or more bits) or 320 milliseconds (16 or more bits). If fewer than all the N bits are known, the coherent integration time may be established at a value less than the maximum value but greater than the default value, based on the number of consecutive upcoming bits which are known. Optionally, the step of determining whether information is known and valid may be two or more separate steps.

In some cases, no information is known. In those cases, the coherent integration time is set at the minimum or default time until the information is obtained by the device. Once the information is first known, the coherent integration time is lengthened to increase the ability to detect signals while keeping the overall integration time relatively short. Alternatively, the coherent integration time can be lengthened and the total integration time also lengthened to further increase the ability to detect weak signals. However, known information potentially becomes unknown or may decay over time. For example, if the next N bits of data relate to almanac information, the stored almanac information may be old information. Thus, determining whether the next N bits of data are known and valid may include checking how long ago the information was obtained, sometimes referred to as the age of the information. If the almanac information is less than, for example, 1 day old, the information may be considered valid, but if the almanac information is more than, for example, 1 day old, the almanac information may be considered stale or invalid. When time is an element of whether the information is old, the time may be computed using counter/timer 212. The counter/timer 212 would be reset when new almanac data is obtained. When the counter/timer 212 hits a value that indicates the stored almanac data is, for example, 1 day old, the determination would be that the information is not valid. If the first type of information is no longer valid, the coherent integration time is set to the default value. Similarly, for ephemeris information, the ephemeris information being transmitted is generally considered valid (that is, it is unchanged) for up to 2 hours. Thus, when the ephemeris information is first obtained, the counter/timer 212 is reset. Based on the Toe (Time of Ephemeris) time contained within the ephemeris data and current time, an expected elapsed time of when the ephemeris changes next is typically Toe plus 2 hours minus current time. When counter/timer 212 indicates that this elapsed time has passed since the ephemeris information was obtained, the ephemeris information is considered stale or invalid. During the portion of the satellite message corresponding to ephemeris data (the second and third sub-frames shown in FIG. 3), the coherent integration time may be set to the default value until fresh ephemeris information is obtained (so that at least some bits of the second and third sub-frames corresponding to ephemeris information are now known). Counter/timer 212 may be reset once current ephemeris information is obtained. Notice, if the known information does not decay or become obsolete, the steps of determining whether information is valid are unnecessary. Reference to known and valid should therefore be construed as including those situations where an explicit determination of validity is not performed because the known information implicitly is valid information. Alternatively to providing a counter, control processor 202 may compare a timestamp on the data to actual time to determine the age or staleness of the data.

Figure 5:
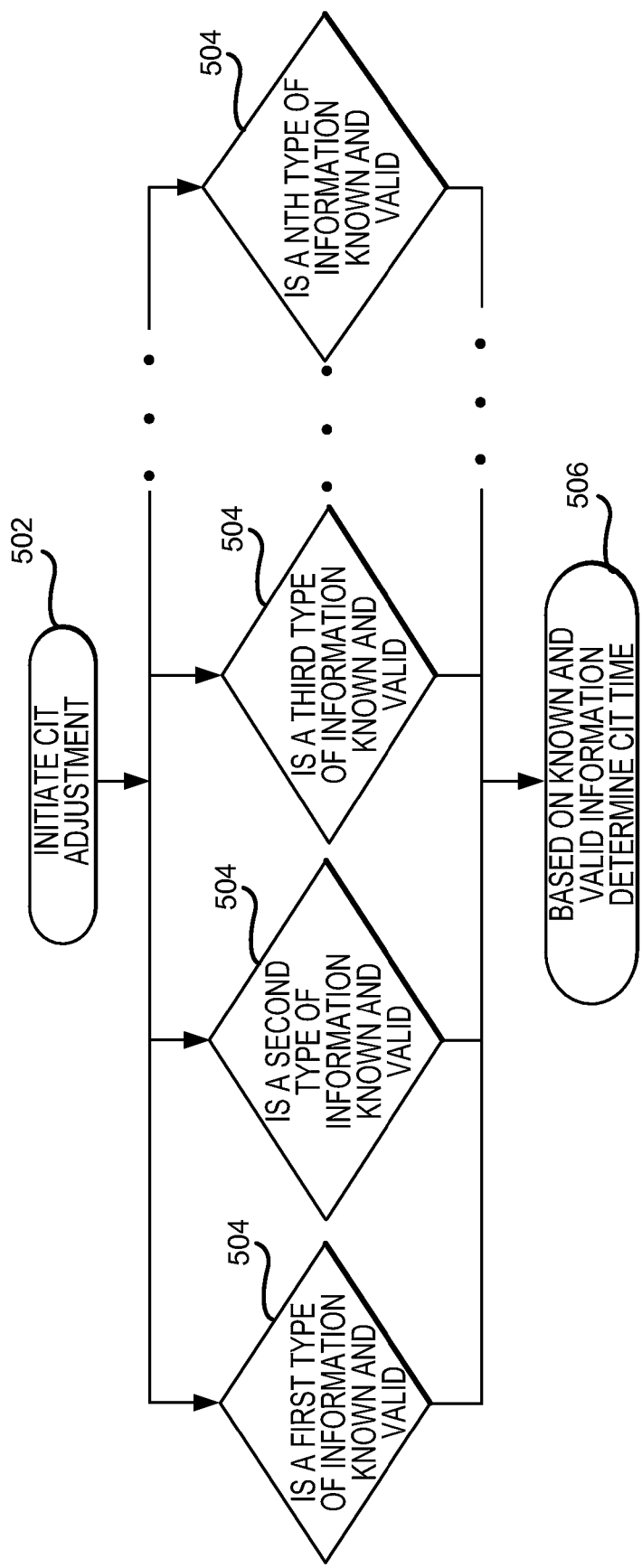
FIG. 5 is an exemplary embodiment of operational steps illustrating one exemplary operation of the technology of the present application.
Figure 6:
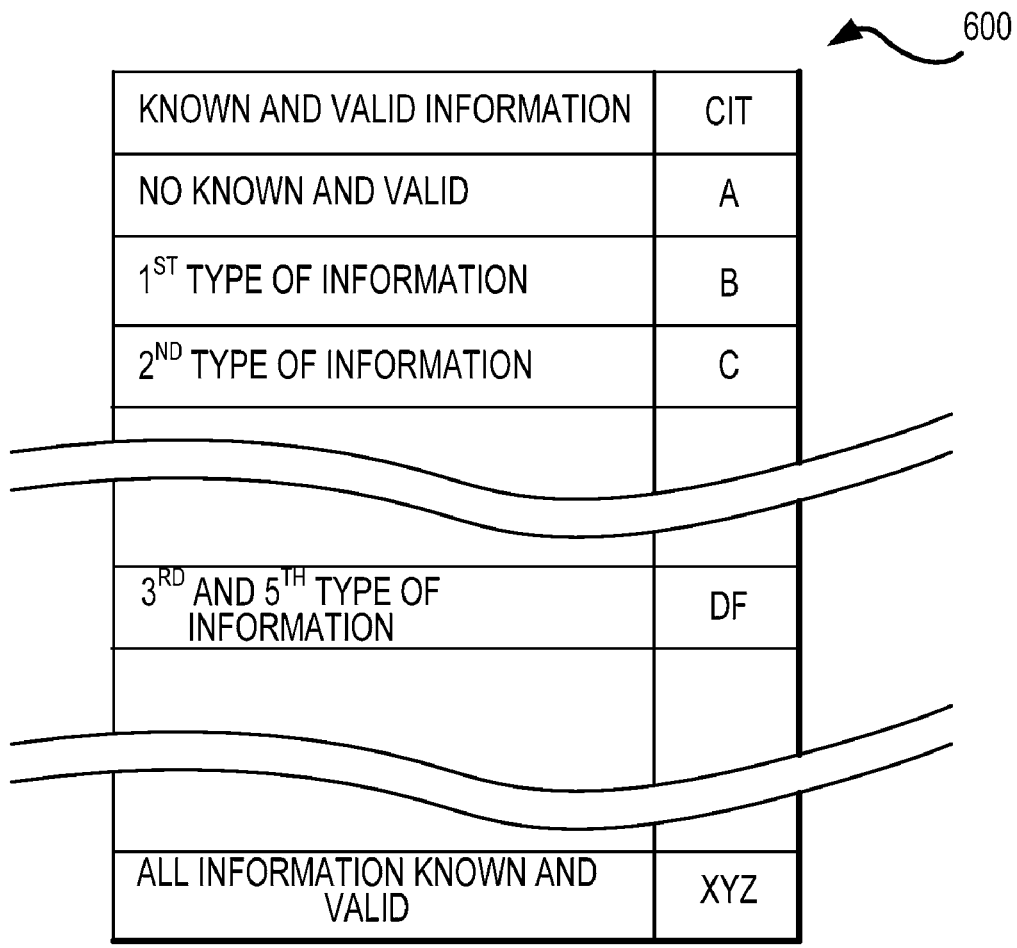
FIG. 6 is an exemplary table of the operation of FIG. 5.

As shown in the exemplary operation of FIG. 4, it may be possible to adaptively change the amount of the coherent integration time by determining whether particular types of information are known and valid, which may be accomplished using a process such as that shown in FIG. 5. In this case, the coherent integration time setting would be based on a determination of whether different types of information are known and valid. At step 502, a process is initiated to adaptively determine a coherent integration time. Next, shown in parallel, but could be accomplished in series, parallel, or a combination thereof, it is determined whether 1st to nth types of information are known and valid, step 504. Notice, the known and valid determinations have been collapsed into a single step, but could be multiple steps as a matter of choice. Next, based on the known and valid types of information, a coherent integration time is determined, step 506. The determination may be subject to numerous methods of determination. For example, FIG. 6 shows an exemplary table 600 that could be stored in memory 210 having the various combinations of known and valid information and an assigned coherent integration time associated with the combination.

Figure 7:
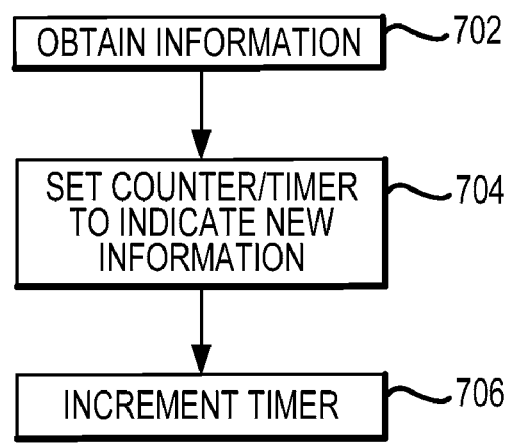
FIG. 7 is an exemplary embodiment of operational steps illustrating one exemplary operation of the technology of the present application.

Control processor 202 may timestamp the data with the date/time it was obtained. At any instance of time, the control processor may determine the current date/time (by using, for example, real clock time or the like) and may compute the age of the information to determine validity of the earlier stored data. Alternatively, referring now to FIG. 7, an exemplary operation of establishing a counter/timer 212 for determining age of information is provided. First, at block 702, mobile receiver 102 obtains almanac information, ephemeris information, and/or other information from a satellite signal. In response, counter/timer 212 is reset to show the information is new, which indicates the information is valid, step 704. Notice, counter/timer 212 may be designed to have multiple bins to count or mobile receiver 102 may be designed with multiple counter/timers 212. When counter/timer 212 indicates the almanac information, ephemeris information, or other information has aged beyond predetermined limits, control processor 202 would read counter/timer 212 and determine the known information is invalid, step 706. As explained above, the invalid indication would cause the coherent integration time to be altered to a shorter time. As mentioned, ephemeris would generally be considered valid for 2 to 4 hours and almanac would generally be considered valid for one or more days. The information would be considered invalid if older or aged beyond the predetermined threshold. Of course, depending on system characteristics, the information could be considered valid for longer or shorter periods as a matter of design choice. If longer, then the designer runs the risk that the incoming data is different, and the bits assumed known are actually different than expected resulting in a possible degradation of performance. If shorter, then the designer takes advantage of the known information for a period shorter than possible.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Additionally, although the characteristics of the GPS navigation message have been used as an example, different characteristics may be used. For example, different types of satellite position versus time information may be included in a satellite data message (such as longer term orbit information that is valid for longer than ephemeris but less than almanac). Different satellite systems may have satellite data message with different formats (e.g., different bit sequences) and different characteristics (e.g., different data rates corresponding to bit durations different than 20 milliseconds). However, the techniques disclosed herein may be applied to different satellite systems than GPS, and also to combinations of satellite systems.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for adaptively adjusting a coherent integration time of a mobile receiver, the method comprising:
    receiving a current bit of a signal at the mobile receiver;
    determining whether any of a next number of bits N in the signal are known;
    setting the coherent integration time to a first value based on knowing at least all the next number N of bits, where N corresponds to a maximum coherent integration time based on one or more frequency bin processing parameters;
    setting the coherent integration time to a second value based on knowing fewer than N of the next number of bits, the second value shorter than the first value; and
    setting the coherent integration time to a third value if none of the next number N of bits are known, the third value shorter than the second value.

2. The method of claim 1 wherein determining whether any of the next number of bits N in the signal are known comprises determining whether information indicative of any of the next number of bits is valid information.

3. The method of claim 1 wherein the next number of bits N in the signal include at least one bit indicative of orbital position information.

4. The method of claim 3 wherein the next number of bits N in the signal include at least one bit indicative of almanac information and/or at least one bit indicative of ephemeris information.

5. The method of claim 1 wherein the next number of bits N in the signal include at least one bit indicative of satellite clock information.

6. The method of claim 1 wherein the next number of bits N in the signal include at least one bit indicative of time and/or synchronization information.

7. The method of claim 1 wherein the next number of bits N in the signal include at least one bit indicative of ionosphere, UTC (Coordinated Universal Time), and/or satellite health information.

8. The method of claim 1 wherein the receiving a current bit of a signal comprises receiving a current bit of a signal from a positioning system selected from the group of positioning systems consisting of: a satellite positioning system; a terrestrial positioning system, and a satellite and terrestrial positioning system.

9. The method of claim 8 wherein the satellite positioning system is selected from the group of satellite positioning systems consisting of: Global Positioning System, Galileo positioning system, Glonass. Compass/Beidou, and Quasi-Zenith Satellite System (QZSS).

10. The method of claim 2 wherein determining whether the information indicative of any of the next number of bits is valid information comprises determining the age of the information indicative of any of the next known number of bits.

11. The method of claim 10 further comprising setting a counter to indicate new information when new almanac information, new ephemeris information, new satellite clock information, and/or new time information is received.

12. The method of claim 10 wherein determining the age of the information indicative of any of the next known number of bits comprises determining the age by comparing a current time with a time of acquisition of the information indicative of the next known number of bits.

13. A computer program product comprising:
    a computer readable storage medium comprising:
        program code to access information indicative of a signal at the mobile receiver;
        program code to determine an amount of future information contained in the signal that is known;
        program code to adaptively set a coherent integration time based on the amount of known future information, wherein the program code is to adaptively set the coherent integration time to a coherent integration time less than or equal to a maximum coherent integration time based on one or more frequency bin processing parameters; and
        program code to set the coherent integration time to a default value if there is no known information.

14. The computer program product of claim 13 wherein the program code to determine an amount of future information contained in the signal that is known comprises program code to set a counter/timer to determine the validity of stored information.

15. The computer program product of claim 13 comprising code to store satellite orbital information to memory.

16. The computer program product of claim 15 wherein the satellite orbital information includes at least some ephemeris information and/or at least some almanac information.

17. The computer program product of claim 13 comprising code to store satellite clock information to memory.

18. The computer program product of claim 13 comprising code to store time and synchronization information to memory.

19. A mobile device comprising:
a receiver to receive navigation signals, the navigation signals including a selected bit;
a processor configured to adaptively adjust a coherent integration time by:
determining whether any of a next number of bits N subsequent to the selected bit in the signal are known;
setting the coherent integration time to a first value based on knowing at least all the next number N of bits, where N corresponds to a maximum coherent integration time based on one or more frequency bin processing parameters;
setting the coherent integration time to a second value based on knowing fewer than N of the next number of bits, the second value shorter than the first value; and
setting the coherent integration time to a third value if none of the next number N of bits are known, the third value shorter than the second value.

20. The mobile device of claim 19, wherein determining whether any of the next number of bits N subsequent to the selected bit in the signal are known comprises determining whether information indicative of any of the next number of bits is valid information.

21. The mobile device of claim 19 wherein the next number of bits N in the signal include at least one bit indicative of orbital position information.

22. The mobile device of claim 21 wherein the next number of bits N in the signal include at least one bit indicative of almanac information and/or at least one bit indicative of ephemeris information.

23. The mobile device of claim 19 wherein the next number of bits N in the signal include at least one bit indicative of satellite clock information.

24. The mobile device of claim 19 wherein the next number of bits N in the signal include at least one bit indicative of time and/or synchronization information.

25. The mobile device of claim 19 wherein the next number of bits N in the signal include at least one bit indicative of ionosphere, UTC (Coordinated Universal Time), and/or satellite health information.

26. The mobile device of claim 19 wherein the receiving a selected bit of a signal comprises receiving a current bit of a signal from a positioning system selected from the group of positioning systems consisting of: a satellite positioning system; a terrestrial positioning system, and a satellite and terrestrial positioning system.

27. The mobile device of claim 26 wherein the satellite positioning system is selected from the group of satellite positioning systems consisting of: Global Positioning System, Galileo positioning system, Glonass, Compass/Beidou, and Quasi-Zenith Satellite System (QZSS).

28. A mobile device comprising:
means for receiving navigation signals including a selected signal bit;
means for determining whether any of a next number of bits N subsequent to the selected signal bit in the signal are known;
means for adaptively setting a coherent integration time for integrating correlation results, the means for adaptively setting the coherent integration time comprising means for:
setting the coherent integration time to a first value based on knowing at least all the next number N of bits, where N corresponds to a maximum coherent integration time based on one or more frequency bin processing parameters;
setting the coherent integration time to a second value based on knowing fewer than N of the next number of bits, the second value shorter than the first value; and
setting the coherent integration time to a third value if none of the next number N of bits are known, the third value shorter than the second value.

29. The mobile device of claim 28 wherein the means for determining whether any of the next number of bits N in the signal are known comprises means for determining whether information indicative of any of the next number of bits is valid information.

30. The mobile device of claim 28 wherein the next number of bits N in the signal include at least one bit indicative of orbital position information.

31. The mobile device of claim 30 wherein the next number of bits N in the signal include at least one bit indicative of almanac information and/or at least one bit indicative of ephemeris information.

32. The mobile device of claim 28 wherein the next number of bits N in the signal include at least one bit indicative of satellite clock information.

33. The mobile device of claim 28 wherein the next number of bits N in the signal include at least one bit indicative of time and/or synchronization information.

34. The mobile device of claim 28 wherein the next number of bits N in the signal include at least one bit indicative of ionosphere, UTC (Coordinated Universal Time), and/or satellite health information.

35. The mobile device of claim 28 wherein the means for receiving a current bit of a signal comprises means for receiving a current bit of a signal from a positioning system selected from the group of positioning systems consisting of: a satellite positioning system; a terrestrial positioning system, and a satellite and terrestrial positioning system.

36. The mobile device of claim 35 wherein the satellite positioning system is selected from the group of satellite positioning systems consisting of: Global Positioning System, Galileo positioning system, Glonass, Compass/Beidou, and Quasi-Zenith Satellite System (QZSS).

37. The mobile device of claim 29 wherein the means for determining whether the information indicative of any of the next number of bits is valid information comprises means for determining the age of the information indicative of any of the next known number of bits.

38. The mobile device of claim 37 further comprising means for setting a counter to indicate new information when new almanac information, new ephemeris information, new satellite clock information, and/or new time information is received.

39. The mobile device of claim 37 wherein the means for determining the age of the information indicative of any of the next known number of bits comprises means for determining the age by comparing a current time with a time of acquisition of the information indicative of the next known number of bits.

40. The method of claim 1, wherein the one or more frequency bin processing parameters comprise a frequency bin number and/or a frequency bin width.

41. The computer program product of claim 13, wherein the one or more frequency bin processing parameters comprise a frequency bin number and/or a frequency bin width.

42. The mobile device of claim 19, wherein the one or more frequency bin processing parameters comprise a frequency bin number and/or a frequency bin width.

43. The mobile device of claim 28, wherein the one or more frequency bin processing parameters comprise a frequency bin number and/or a frequency bin width.

* * * * *